United States Patent [19]
Stefanek

[11] Patent Number: 5,823,908
[45] Date of Patent: Oct. 20, 1998

[54] DIFFERENTIAL SPIDER WITH RETAINING CAPS FOR RETAINING BEVEL PINIONS IN A DIFFERENTIAL

[75] Inventor: Gerald Andrew Stefanek, Ft. Wayne, Ind.

[73] Assignee: Dana Corporation, Toledo, Ohio

[21] Appl. No.: 728,954

[22] Filed: Oct. 11, 1996

[51] Int. Cl.⁶ .................................................. F16H 48/06
[52] U.S. Cl. ........................ 475/230; 74/665 GB; 74/413
[58] Field of Search ............................. 74/665 GB, 413, 74/417; 475/230, 231, 232

[56] References Cited

U.S. PATENT DOCUMENTS

| | | | |
|---|---|---|---|
| 1,006,847 | 10/1911 | Heaslet | 475/230 |
| 1,185,174 | 5/1916 | Brush | 475/230 |
| 2,064,152 | 12/1936 | Conboy | 475/233 |
| 2,206,907 | 7/1940 | Loughridge | 475/89 |
| 2,209,966 | 8/1940 | Goeller | 475/233 |
| 2,495,016 | 1/1950 | Mesick | 475/231 X |
| 2,997,898 | 8/1961 | Ellis | 74/665 GB |
| 3,653,280 | 4/1972 | Koskela | 475/230 |
| 4,455,889 | 6/1984 | Hauser | 475/230 |
| 5,304,103 | 4/1994 | Schlosser | 475/230 |
| 5,545,102 | 8/1996 | Burgmann et al. | 475/230 |
| 5,662,544 | 9/1997 | Schlosser et al. | 475/230 |

FOREIGN PATENT DOCUMENTS

| | | | |
|---|---|---|---|
| 2844918 | 4/1980 | Germany | 475/230 |
| 4042174 | 7/1992 | Germany | 475/230 |
| 22352 | of 1906 | United Kingdom | 475/230 |
| 255952 | 7/1926 | United Kingdom | 475/230 |
| 8101450 | 5/1981 | WIPO | 475/230 |

*Primary Examiner*—Khoi Q. Ta
*Attorney, Agent, or Firm*—Oldham & Oldham, Co., L.P.A.

[57] ABSTRACT

A retaining cap for an arm of a differential frame in an interaxle differential assembly removably secures a pinion gear on the arm between a central hub of the frame and the retaining cap, without the cap being supported by a frame structure. The retaining cap has female threading which engages male threading on the distal portion of the arm. An effective amount of a thread locking compound is applied to the threading prior to engagement.

19 Claims, 2 Drawing Sheets

DIFFERENTIAL SPIDER WITH RETAINING CAPS FOR RETAINING BEVEL PINIONS IN A DIFFERENTIAL

The present invention relates to a power divider assembly as used in a differential gear assembly. More particularly, the present invention relates to a novel assembly which eliminates the differential case that has been previously required and also allows the pinion gears to be removed from the pinion shaft for maintenance.

BACKGROUND OF THE ART

An interaxle differential gear assembly allows an output drive axle to rotate at a different speed than an input drive axle. One type of the differential assembly transmits torque from the input drive axle to the output drive axle by rotating a case surrounding a pinion gear assembly. Because the case is rotated, this type is generally known as a "case driven" differential. Such case driven differentials are a distinct class of differentials that transfer torque by rotation of the case surrounding the differential assembly. Torque is transferred to the pinion gear shaft at a portion of the shaft radially outwardly of the pinion gear. The entire torque load is generally carried by the case. In a case driven differential, the pinion gear is generally retained on its shaft by the case, or by a structure in combination with the case.

In a heavy duty application, a four pinion gear assembly is generally required to transmit substantial amounts of torque through a case driven differential. The four pinion gear assembly distributes the torque over the four pinion gears to reduce tooth stress load on the gears. The pinion gears are usually positioned on a cross-shaped shaft in a meshing arrangement between a pair of side gears.

In the second type of differential assembly, known as the "center driven" differential, the torque is transmitted directly to the center of the differential assembly, and generally directly rotates the pinion gear shaft instead of rotating the case. With the center driven differential, the entire torque load is generally borne by the pinion gear shaft rather than the case. Prior art methods of retaining the pinion gears on their shaft have used a case to provide additional support for retaining the pinion gears. It has been taught in the prior art that the use of threaded caps received on the threaded pinion shaft or snap rings affixed to the pinion shaft are inadequate to retain the pinion gear on the pinion shafts when the pinion gearing is subjected to high torque loads. However, the case reduces the accessibility of the pinion gears for lubrication and reduces the space available for the gears, which then results in the use of smaller gears.

There is at least one piece of prior art in which the case is eliminated, and the pinion gears are retained on the pinion shaft non-removably by welding, force fitting or riveting. These solutions do not allow for ready access to the pinion gears and they also restrict lubricant access to the pinions gears somewhat more than is optimal.

SUMMARY OF THE INVENTION

It is, therefore an object of the present invention to provide a self-supporting retaining cap for a shaft of a differential gear assembly wherein the retaining cap is removable from the shaft for providing access to the pinion gear. This and other objects of the present invention are provided by a differential assembly for a vehicle comprising a differential frame having a central hub with a plurality of arms extending radially outwardly from a proximal end to a distal end from the central hub. A pinion gear is received upon each of the plurality of arms, such that each pinion gear is rotatable about the arm on which it is received. Each pinion gear is retained on the arm by a retaining cap removably secured to the distal end of each of the plurality of arms such that the pinion gear rotatably received on the arm is held in place between the central hub and the retaining cap. Each retaining cap is supported only by the differential frame and has a free outer peripheral surface and a free axial end surface.

BRIEF DESCRIPTION OF THE DRAWINGS

Better understanding of the present invention will be had when reference is made to the accompanying drawings, wherein identical parts are identified with identical reference numerals, and wherein.

DETAILED DESCRIPTION OF THE DRAWINGS

Figure 1:
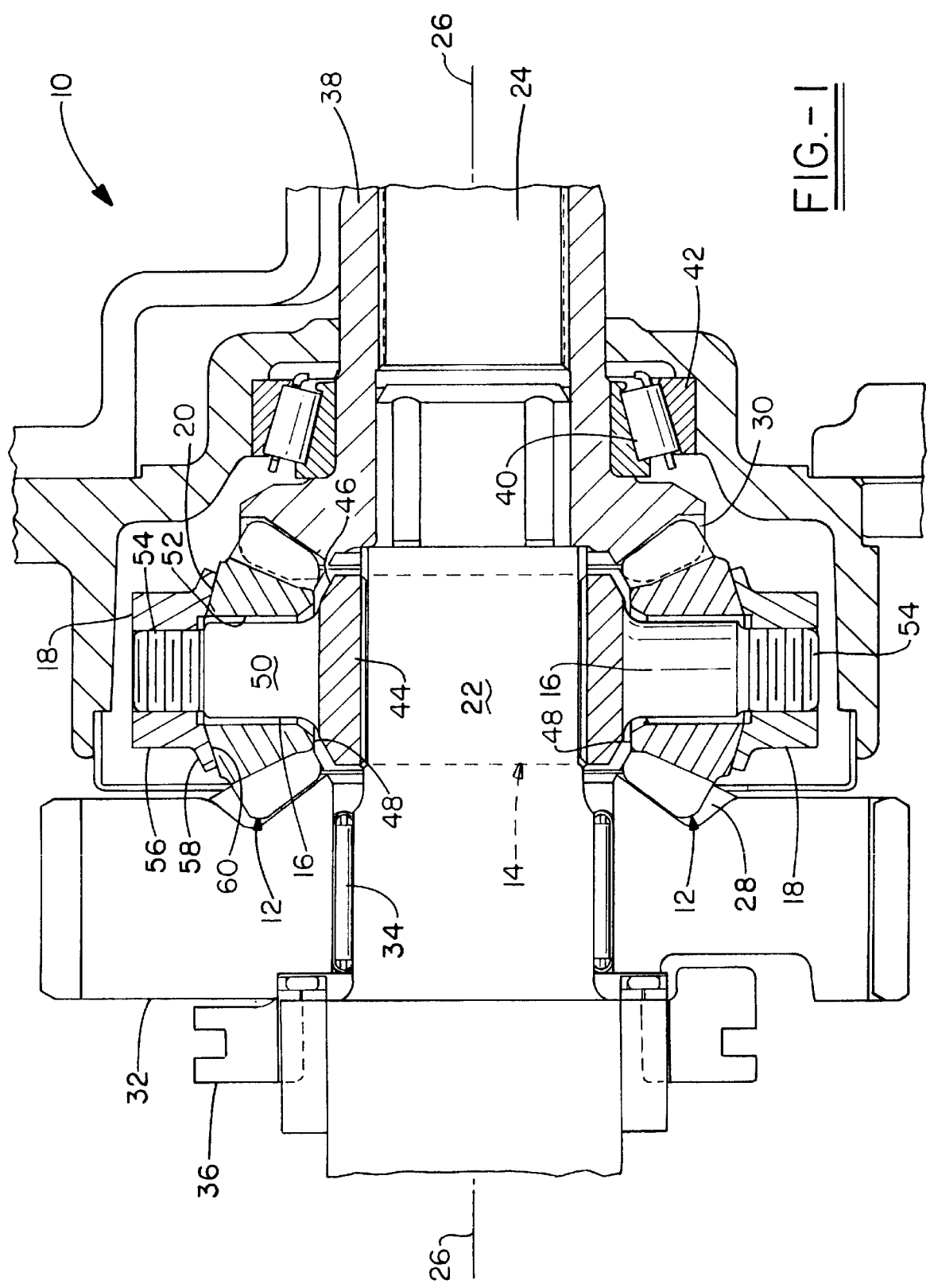
FIG. 1 shows a cross-sectional view of a center driven interaxle differential gear assembly of the present invention.

The interaxle differential assembly 10 of the present invention is shown in a side view in FIG. 1. The differential assembly 10 as illustrated includes four pinion gears or mates 12 mounted on a differential frame 14, known also as a differential cross or "spider". The specific differential frame illustrated has four arms 16 with one pinion gear 12 mounted on each arm, but the invention is not limited to a differential frame having four pinion gears mounted on four arms. Instead, the invention is directed to a differential frame 14 having a plurality of arms 16, each bearing a pinion gear or mate 12. In most applications, the number of arms 16 will be four, but the number can be as low as two and can be higher than four, although most practical applications would probably not contain more than six arms. Input torque is transmitted directly to a central portion 17 of differential frame 14. Each pinion gear 12 is retained on one of the arms 16 of differential frame 14 by a self-supported retaining cap 18, the further details of which will be described below. "Self-supporting" in this context means that retaining cap 18 is supported only by differential frame 14 on which it is mounted. Retaining cap 18 is fixed to differential frame 14 in a manner described below, but is otherwise unsupported by a case or any other member of differential assembly 10. Additionally, each retaining cap 18 alone sufficiently retains a pinion gear 12 on an arm 16, even under high loads. No washer is interposed between the pinion gear 12 and the retaining cap 18. Therefore, the axial outer surface 20 of the pinion gear 12 is also unsupported.

Input torque generated external to the interaxle differential assembly 10 enters the assembly on an input drive axle 22 and is ultimately transmitted to an output drive axle 24 through the differential assembly. Each of these drive axles 22 and 24 rotate coaxially about a drive axis 26. Side gears 28 and 30 are supported about drive axles 22 and 24, respectively. Pinion gears 12 are disposed between side gears 28, 30 with which they mesh when allowed to engage, as shown in FIG. 1. Differential frame 14 is rotationally fixed to input drive axle 22, typically by corresponding splining on the drive axle exterior and the interior surface of central portion 17 of the differential frame. The exterior splines are received within the interior splines, preventing rotation of differential frame 14 relative to input drive axle 18. Side gear 28 is mounted on drive gear 32, which in turn is slidingly mounted, as by needle bearing 34, to input drive axle 22. Although the specific support means for drive gear 32 on input drive axle 22 shown in FIG. 1 is a needle bearing 34, a bushing could be used in applications that require lower load limits, as will be clearly understood by one of skill in the art. Engagement of side gear 28 with the pinion gears 12 is controlled through clutch collar 36, which is affixed to the face of drive gear 32 opposite the face on which side gear 28 is mounted. Side gear 28 is rotationally fixed to output drive axle 24 through differential gear 38. The mounting of differential gear 38 on output drive axle 24 is by splining or other known means of fixing a gear to an axle. Differential gear 38 is mounted within the overall housing by a taper bearing 40 in bearing cup 42.

Each pinion gear 12 has a beveled construction interfacing with mating beveled side gears 28 and 30. The pinion gears 12 as a group mesh with side gears 28 and 30 to allow input drive axle 22 to rotate at a different speed than output drive axle 24. Teeth of pinion gears 12 mesh with corresponding teeth on both side gears 28, 30.

Figure 2:
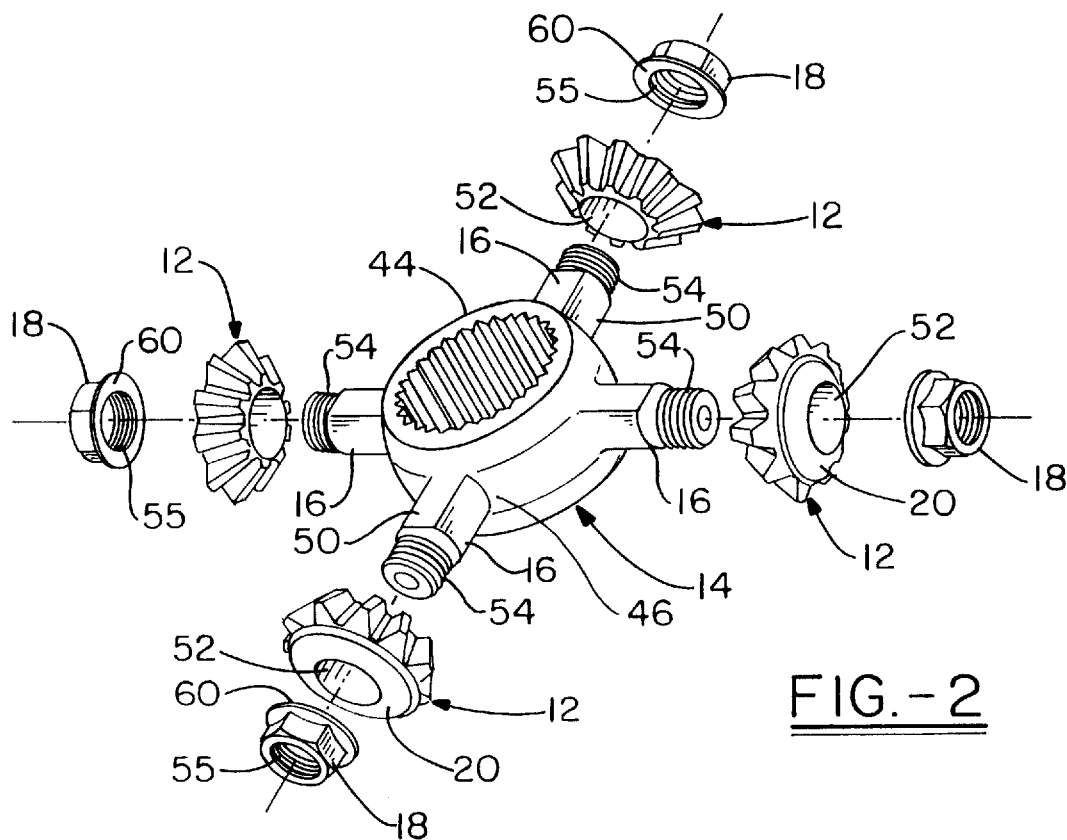
FIG. 2 shows an exploded view of the differential frame portion of the assembly of FIG. 1.

Attention is now directed to FIG. 2, which shows the differential frame 14 of the present invention removed from the differential assembly of FIG. 1. The differential frame 14 includes a central hub 44 and four arms 16, each of which extends radially outwardly from the central hub. Each arm 16 has an axis which extends radially outwardly from drive axis 26 when central hub 38 is mounted onto input drive axle 24, with each arm axis disposed in a plane normal to the drive axis. A retaining cap 18 is secured to each arm 16 at a radially outer end thereof to retain a pinion gear 12. No washer is necessary between retaining cap 18 and pinion gear 12 for reducing wear on an inner surface 46 of retaining cap 18, which is otherwise in facial engagement with axial outer surface 20 of pinion gear 12, due to the specific interaction of the retaining cap with the pinion gear.

Referring back to FIG. 1, the placement of each pinion gear 12 upon an arm 16 of the differential frame 14 is demonstrated. Each arm 16 is rooted in the central hub 44 such that the central hub provides a shoulder 46 upon which an axial inner surface 48 of the pinion gear 12 may rest when the pinion gear is placed on the arm. Each arm 16 originates at the central hub 44 with a first portion 50 near the central hub having a first diameter. Each pinion gear 12 has a central aperture 52 which is larger than the first diameter, so that the pinion gear is free to rotate on the first portion 50 when the pinion gear is placed on the arm 16. At the axially outward or distal end of the arm 16, a second portion 54 of the arm 16 is defined by a diameter which is smaller than the first diameter, as well as the presence of male threading on the exterior surface. This male threading extends from the distal end of the arm 16 inwardly to approximately the point where the axial outer surface 20 of the pinion gear 12 will be found when the pinion gear is atop the arm. It is preferred to extend the male threading slightly beyond the length needed for the retaining cap 18 to snugly hold the pinion gear 12 in place against the shoulder 46 on the central hub 44, so that some variation in the pinion gear size still results in a operable fit. It is especially noted that the second portion 54 of arm 16 extends axially outwardly from the pinion 12 when the pinion is placed on the arm, and the entire engagement of the retaining cap 18 with the arm occurs axially outwardly from the outer end of the pinion gear, so that the retaining cap facially engages the axial outer surface 20 of the pinion gear and not an interior surface.

The pinion gear 12 used in the invention has a relatively flat axial inner surface 48, but is provided with a convex spherical axial outer surface 20, as is particularly well shown in FIG. 1. Pinion gear 12 has an axial length which permits some slight amount of play along the first portion 50 of arm 16 when the retaining cap 18 is threadingly secured to the second portion 54. This slight play permits lubricant to freely cover the mating surfaces where the pinion gear may bear upon the shoulder or the retaining cap. Pinion gear 12 is manufactured from a heat treated steel as will be known to the person of ordinary skill and no special heat treating beyond that conventionally used is believed to be necessary.

The preferred retaining cap 18 of the present invention is a flange spherical nut, preferably a hex flange spherical nut as described further below. This retaining cap 18 is fixed to arm 16 by engaging complementary female threading on the interior of a central aperture 55 of the cap 18 with the male threading provided on the second portion 54 of the arm. When pinion gear 12 is placed on the arm 16 and retaining cap 18 is torqued onto the threading on arm 16, neither pinion gear 12 nor retaining cap 18 is supported by a case. Thus, differential assembly 10 is constructed without a case, simplifying the assembly and reducing the amount of material used. Additionally, the outer surfaces of retaining cap 18 are free of any contact with any structure of differential assembly 10, which permits unencumbered lubrication clearances for pinion gears 12. In securing the retaining cap 18 to arm 16, it is preferred to apply a thread locking compound to the respective threads before engaging them, thereby assisting in holding the retaining cap upon the arm. A typical thread locking compound is sold by Loctite Corporation under the tradename LOCTITE 272, although other such thread locking compounds are known and may be found to be equally effective. In applying the retaining cap 18 to the arm 16, it is preferred to torque the cap to approximately 200 ft-lbs. From this description, it will be understood that the retaining cap 18 is intended to be removably applied to the arm, to facilitate access to or replacement of the underlying pinion gear 12 at some point in the future, but that the application of the retaining cap is also intended to not allow any significant loosening of the cap from the arm during exposure to the stresses encountered in operation.

Figure 3:
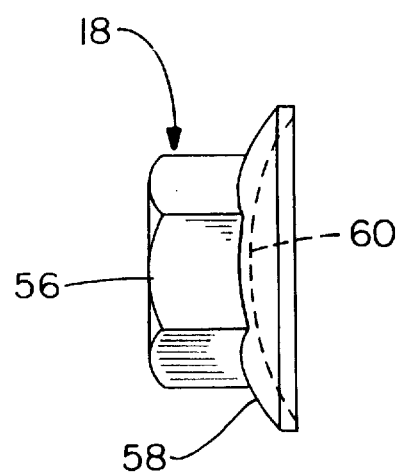
FIG. 3 shows a side view of the retaining cap of the present invention.

The preferred hex flange spherical nut used in the present invention as retaining cap 18 is commercially available in a variety of sizes and the size will be specifically selected to compliment the pinion gear 12 being retained. The particular advantage of the hex flange spherical nut in this application is believed to lie in the fact that the hex flange spherical nut provides a portion of the nut which directly bears against the pinion gear and which has a larger diameter than the diameter of the hexagonal surfaces of the nut, thereby providing some wear surface. As is shown in FIG. 3, the retaining cap 18 has a head portion 56 with an end of the head portion blending into an end of a cupped portion 58. The head portion 56 is adapted for engagement with a wrench or the like, and is preferred to be hexagonal in cross-section. The cupped portion 58 is circular in cross-section and has a larger diameter than the head portion 56. The cupped portion 58 has a concave spherical surface 60 located at the end opposite the head portion. This concave spherical surface 60 interacts with the axial outer surface 20 of pinion gear 12, so it is highly preferred that surfaces 20 and 60 each have closely-toleranced radii of curvature to permit maximum contact area between the gear and the cap. Preferred materials for the retaining cap 18 include S.A.E. 1040 which has been processed with nitride to increase wear resistance or S.A.E. 4140. This latter material, after heat treatment, provides a better wear surface due to the higher carbon content. The retaining cap 18 also has a central aperture therethrough which has female threading formed thereon. This female threading is sized to complement the male threading on the arms 16.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A differential assembly for a vehicle comprising:
   a differential frame having a central hub with a plurality of arms extending radially outwardly from a proximal end to a distal end from the central hub;
   a pinion gear received upon each of the plurality of arms, each said pinion gear being rotatable about the arm on which it is received; and
   a retaining cap removably secured to the distal end of each of the plurality of arms such that the pinion gear rotatably received on the arm is held in place between the central hub and the retaining cap, each said retaining cap supported only by the differential frame and having a free outer peripheral surface and a free axial end surface.

2. The differential assembly of claim 1 wherein a portion of each said arm near the distal end thereof has male threading formed thereon and a central aperture in each of the retaining caps has complementary female threading formed therein to removably secure the retaining cap to the arm.

3. The differential assembly of claim 2 wherein a thread locking compound is interposed between the male and female threading prior to mating thereof to secure the retaining cap to the arm.

4. The differential assembly of claim 1 wherein each said pinion gear has a generally flat axial inner surface in facial engagement with a generally flat shoulder formed at the proximal end of the arm at the central hub.

5. The differential assembly of claim 4 wherein each said pinion gear further has a convex spherical axial outer surface in facial engagement with a complementary concave spherical inner surface formed in the retaining cap.

6. The differential assembly of claim 2 wherein the retaining cap has a head portion adapted for use of a wrench in threadingly securing the retaining cap to the arm.

7. The differential assembly of claim 6 wherein the head portion has a hexagonal cross section.

8. The differential assembly of claim 7 wherein the retaining cap further has a flange portion adjacent to the head portion, the flange portion having a larger diameter than the head portion.

9. The differential assembly of claim 8 wherein the flange portion further comprises a concave spherical inner surface formed therein.

10. The differential assembly of claim 1 wherein the differential frame has four said arms.

11. A differential system, comprising:
    an input axle transmitting rotation, the input axle including a first side gear slidingly secured to the input axle;
    a differential frame having a central hub and a plurality of arms extending radially outwardly from a proximal end to a distal end from the central hub, the central hub being fixed to the input axle to directly rotate the differential frame;
    a pinion gear received upon each of the plurality of arms to rotate about an axis of the arm;
    an output axle including a second side gear fixed to the output axle, the first side gear and the second side gear each meshing with the pinion gears to transmit rotation from the input axle to the output axle; and
    a retaining cap removably secured to the distal end of each of the plurality of arms such that the pinion gear rotatably received on the arm is held in place between the central hub and the retaining cap, each said retaining cap supported only by the differential frame and having a free outer peripheral surface and a free axial end surface.

12. The differential system of claim 11 wherein the retaining caps have no contact on the free outer peripheral surface or the free axial end surface with any structure of the differential system.

13. The differential system of claim 11 wherein a portion of each said arm near the distal end thereof has male threading formed thereon and a central aperture in each of the retaining caps has complementary female threading formed therein to removably secure the retaining cap to the arm.

14. The differential system of claim 13 wherein a thread locking compound is interposed between the male and female threading prior to mating thereof to secure the retaining cap to the arm.

15. The differential system of claim 11 wherein each said pinion gear has a generally flat axial inner surface in facial engagement with a generally flat shoulder formed at the proximal end of the arm at the central hub.

16. The differential system of claim 15 wherein each said pinion gear further has a convex spherical axial outer surface in facial engagement with a complementary concave spherical inner surface formed in the retaining cap.

17. The differential system of claim 16 wherein the retaining cap has a head portion adapted for use of a wrench in threadingly securing the retaining cap to the arm and a flange portion adjacent to the head portion, the flange portion having a larger diameter than the head portion.

18. The differential system of claim 17 wherein the head portion has a hexagonal cross section and the flange portion has a circular cross section.

19. The differential system of claim 18 wherein the concave spherical inner surface is formed in the flange portion of the retaining cap.

* * * * *